(12) United States Patent
Anand et al.

(10) Patent No.: US 9,805,352 B2
(45) Date of Patent: Oct. 31, 2017

(54) TRANSACTION DATA CAPTURE SYSTEM FOR A POINT OF SALE SYSTEM

(75) Inventors: Abheek Anand, San Francisco, CA (US); Soham Mazumdar, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 914 days.

(21) Appl. No.: 13/565,456

(22) Filed: Aug. 2, 2012

(65) Prior Publication Data

US 2014/0040014 A1    Feb. 6, 2014

(51) Int. Cl.
G06Q 30/02    (2012.01)
G06Q 20/20    (2012.01)
G06Q 30/06    (2012.01)

(52) U.S. Cl.
CPC ............ *G06Q 20/20* (2013.01); *G06Q 30/06* (2013.01)

(58) Field of Classification Search
USPC ................ 705/14.24, 14.33, 14.38, 14.65
See application file for complete search history.

(56) References Cited

U.S. PATENT DOCUMENTS

| | | | |
|---|---|---|---|
| 6,415,341 | B1 | 7/2002 | Fry, Sr. et al. |
| 2002/0103834 | A1* | 8/2002 | Thompson et al. .......... 707/526 |
| 2005/0023346 | A1* | 2/2005 | Bakker et al. ................ 235/383 |
| 2005/0261969 | A1 | 11/2005 | Dimmock et al. |
| 2007/0194105 | A1* | 8/2007 | Kissick ......................... 235/379 |
| 2009/0006151 | A1* | 1/2009 | Zarghami et al. ................ 705/7 |
| 2010/0010905 | A1* | 1/2010 | Arzumanyan et al. ......... 705/21 |
| 2010/0301113 | A1* | 12/2010 | Bohn et al. ................... 235/380 |
| 2010/0306168 | A1* | 12/2010 | Ostad et al. .................. 707/603 |

OTHER PUBLICATIONS

Eric Thomson, Benefits of Electronic Receipt Capture, at:http://www.greensheet.com/gs_archive.php?issue_number=020901&story=3.*

* cited by examiner

*Primary Examiner* — Patricia H Munson
(74) *Attorney, Agent, or Firm* — Perkins Coie LLP

(57) ABSTRACT

A method of operation of a transaction collection system includes: initializing a sniff daemon on the POS terminal; determining a sales transaction on the POS terminal; recording a transaction document of the sales transaction on a memory of the POS terminal; collecting the transaction document from the memory with the sniff daemon; and providing the transaction document for interpretation on an external system.

21 Claims, 6 Drawing Sheets

TRANSACTION DATA CAPTURE SYSTEM FOR A POINT OF SALE SYSTEM

FIELD OF INVENTION

This invention relates generally to a transaction data collection system, and in particular to collecting transaction data from a point of sale system.

BACKGROUND

In retail environment, a point of sale (POS) system typically is used at a checkout counter. The POS system may include individual POS terminals at each counter. The transaction between a consumer and a store generally occurs at the POS terminal. The POS terminal can act as a credit card terminal. A consumer's credit card can be swiped at the POS terminal or a peripheral attached to the POS terminal.

For some of the POS systems, the transaction information is printed on a receipt. A copy of the receipt can be kept in the store or given back to the consumer. Traditional POS systems are primarily used to execute sales of goods and services. The POS systems can print receipts and record transactions. However, commercial pressure requires the traditional POS systems to be improved to better serve the customers and the sellers.

Thus, a need remains for an effective methodology to collect transaction information from a POS system.

DISCLOSURE OF INVENTION

The present invention provides a method of operating a transaction collection system including: initializing a sniff daemon on a point-of-sale (POS) terminal; determining a sales transaction on the POS terminal; recording a transaction document of the sales transaction on a memory of the POS terminal; collecting the transaction document from the memory with the sniff daemon; and providing the transaction document for interpretation on an external system. The method above can also include interpreting the transaction document to determine a field entry and sending a message to an external system based on the field entry. The interpretation can be based on an optical character recognition. The interpretation can be preformed on the POS terminal or a collection server system such as a web service server.

For example, a method of operating the transaction collection system via the collection server system can include: determining a transaction document from a POS terminal; optically recognizing the transaction document to determine a sold item associated with the transaction document; matching the sold item within an item list; and recording the sold item on the web service system.

For example, the POS terminal can include: a non-transitory memory; a POS application for executing a sales transaction; a printer driver for spooling a transaction page based on the sales transaction onto the non-transitory memory for printing; and a sniffer module for sniffing the transaction page.

A transaction collection system is also disclosed including: a printer; a POS terminal with a run-time sniffer daemon, the POS terminal configured to print a transaction document to the printer, capture the transaction document with the run-time sniffer daemon, and provide the transaction document for optical recognition; and a collection server system configured to: determine the transaction document from the POS terminal, optically recognize a sold item entry from the transaction document, match the sold item entry within an item list, and record the sold item entry on the collection server system.

Some embodiments of the invention have other aspects, elements, features, and steps in addition to or in place of what is described above. These potential additions and replacements are described throughout the rest of the specification

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A POS terminal can be a computer system with Internet access. The transaction information can be stored on a local database on the POS terminal. The local database can be synchronized with a server in batches periodically. The transaction information may also be printed on a printer via a printer driver on the POS terminal.

It has been discovered that effectively collecting and utilizing transaction data available to POS systems can greatly benefit advertisers and promoters. Existing POS systems have proprietary interfaces, making it difficult to extract and collect the transaction data thereon. Further, data that is transferred out of the POS terminal can often be encrypted, making it difficult for an outside device to intercept the messages going out of the POS terminal.

The present invention relates to a transaction collection system and methods of capturing transaction data from a point of sale (POS) system. The present invention utilizes a background process running on the POS system to sniff and collect the transaction data from a printer driver, a print queue, a local database, a batch backup process, or any combination thereof. When collecting the transaction data from any of the above processes or any combination of these processes, the transaction data can be cross-verified. Some of the methods described above can by-pass the encrypted channels of the POS terminal's internal communication system.

The background process can be a modified printer driver that captures printer data, including page description language or printed image data. The background process can also be a communication module that reads the local transaction database on the POS or intercepts the batch updates from a local transaction database to an external database.

The invention can involve a thin layer of software that sits on a POS computer and intercepts receipt print queue contents. Each transaction typically results in a paper receipt being printed. The transaction collection system can capture the receipt images by using a modified print-queue driver, or other suitable sniffing techniques. Once the receipt image is obtained, the transaction collection system can run optical character recognition on it to capture complete details of the transaction it represents. This information includes, amongst other things, the items (SKUs) in the transaction, the price per SKU, total price of transaction, time and place information, as well as any payment information that might be present.

Figure 1:
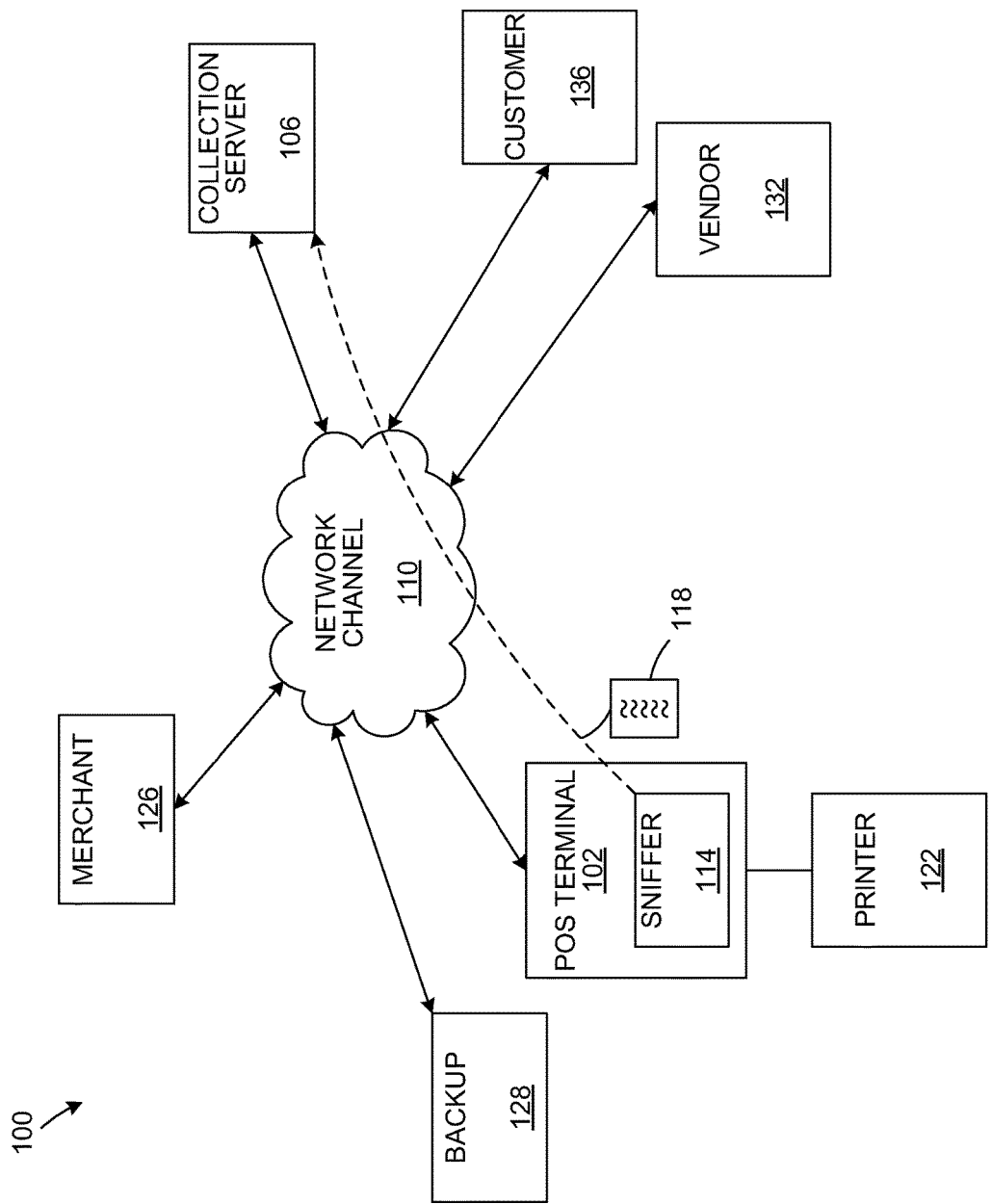
FIG. 1 illustrates a transaction collection system, in accordance with an embodiment of the invention.

FIG. 1 illustrates a transaction collection system 100, in accordance with an embodiment of the invention. The transaction collection system 100 can include a point of sale terminal (POS terminal) 102 in communication with a collection server system 106 through a network channel 110. The POS terminal 102 can include a sniffer module 114. The sniffer module 114 can be for capturing a transaction document 118 from the POS terminal 102.

The POS terminal 102 is one or more machines or devices with network capability to facilitate a sales transaction. The POS terminal 102 can be a computer or a device with computing capabilities. The POS terminal can be a computer system as described in FIG. 6. For example, the POS terminal 102 can be an electronic cash register, a mobile payment device, a software sales register application running on an electronic device, a credit card reader device, a touch screen computer with POS software, a JavaPOS, or a cloud-based POS. The POS terminal 102 can run on an operating system, such as Windows, DOS, iOS, Android, or Linux. The POS terminal 102 can be programmable.

The collection server system 106 is one or more devices with network capability for receiving transaction documents or transaction entries from the POS terminal 102 as shown by the dotted arrow in FIG. 1. Each device in the collection server system 106 can be a computer system as described in FIG. 6. For example, the collection server system 106 can be a networked cloud computing environment, a server cluster, a stand-alone server, a web service server, a specialized server, or any combination thereof.

The sniffer module 114 is for launching a background process on the POS terminal 102 for collecting transaction information. The sniffer module 114 can be implemented as hardware modules, software modules, or any combination thereof. For example, the modules described can be software modules implemented as instructions on a non-transitory memory capable of being executed by a processor or a controller on a computer system described in FIG. 6.

Although it has been illustrated that the sniffer module 114 resides on the POS terminal 102, it is understood that the sniffer module 114 can also reside on an external system, a cloud computing network, or be a hardware component coupled to the POS terminal 102. The sniffer module 114 can be specific to an operating system type of the POS terminal 102.

The transaction document 118 is defined as a file structure containing transaction information as stored on the POS terminal 102. The transaction document 118 can be encrypted or compressed. The transaction document 118 can be, for example, a printable page in the form of an image file. The transaction document 118 can be, for example, a printable page in the form of a print description file. The transaction document 118 can be, for example, a database output or a database copy.

For example, the network channel 110 can be an Ethernet or other wire-based network or a wireless NIC (WNIC) or wireless adapter for communicating with a wireless network, such as a WI-FI network. The network channel 110 can be any suitable network for any suitable communication interface. As an example and not by way of limitation, the network channel 110 can be an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel 110 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the network channel 110 uses standard communications technologies and/or protocols. Thus, the network channel 110 can include links using technologies such as Ethernet, 802.11, worldwide interoperability for microwave access (WiMAX), 3G, 4G, CDMA, digital subscriber line (DSL), etc. Similarly, the networking protocols used on the network channel 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network channel 110 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The transaction collection system 100 can include the collection server system 106. The collection server system 106 is for interpreting the transaction document 118 into a transaction entry for storage and analysis, including optical recognition, optical character recognition, batch data entry, database conversion, parsing, or any combination thereof.

The transaction entry is defined as a data structure of relevant fields interpreted from the transaction document. The transaction entry can be a decrypted data structure if the transaction document is encrypted. The transaction entry can be readily readable on the collection server system 106 without further decoding instructions.

The collection server system 106 can perform a variety of commercial tasks, including matching the transaction entry to a promotion, to a user online presence account, to an inventory record, to a credit record, to other commercial record, or any combination thereof.

The transaction collection system 100 can include a printer 122 coupled to the POS terminal 102. The printer 122 can be for printing receipts of transaction entries executed on the POS terminal 102. For example, the printer 122 can print the transaction document 118.

The transaction collection system 100 can include a merchant internal system 126. The merchant internal system 126 is a computer system, such as a computer system described in FIG. 6. The merchant internal system 126 can be operated by a merchant who also operates the POS terminal 102. The merchant internal system 126 can be for merchants to perform inventory tracking, sales management, accounting, or any combination thereof. The merchant internal system 126 can be in communications with the POS terminal 102 through the network channel 110.

The transaction collection system 100 can include a backup system 128. The backup system 128 is a computer system, such as a computer system as described in FIG. 6. The backup system 128 is for backing up transaction records from the POS terminal 102. The backup system 128 can be in communication with the POS terminal 102 through the network channel 110.

The transaction collection system 100 can include a vendor system 132. The vendor system 132 is a computer system, such as a computer system as described in FIG. 6. The vendor system 132 is a computer system, such as the computer system described in FIG. 6. The vendor system 132 is for vendors of the merchant system 126 to monitor and track inventory, accounting, sales, or any combination thereof. The vendor system 132 can be in communications with the POS terminal 102 or the merchant system 126 via the network channel 110.

The transaction collection system 100 can include a customer device 136. The customer device 136 is a network-enabled device, such as a computer system as described in FIG. 6. The customer device 136 can be in communications with the POS terminal 102, the merchant system 126, the collection server system 106, the vendor system 132, or any combination thereof via the network channel 110. The customer device 136 can be used to make payments on the POS terminal 102. The customer device 136 can be used to login to a customer account on the merchant system 126, the vendor system 132, the collection server system 106, or any combination thereof.

The customer account can be used to match customer identity with the transaction entry identified on the collection server system 106. The customer account can receive incentive rewards when the collection server system 106 recognizes a transaction from the customer account.

The sniffer module 114 can capture transaction information directly from the POS terminal without direct user interaction and it helps to close the loop between any online or offline action and the transaction. Advertising products online can be priced based on the actual transactions they result in when using the sniffer module 114 of the transaction collection system 100. The transaction collection system 100 also allows for tracking purchase information across all customers at a store. Furthermore, the transaction collection system 100 enables a large class of third party applications, including mobile payments, customer relationship management (CRM) and loyalty programs.

Figure 2:
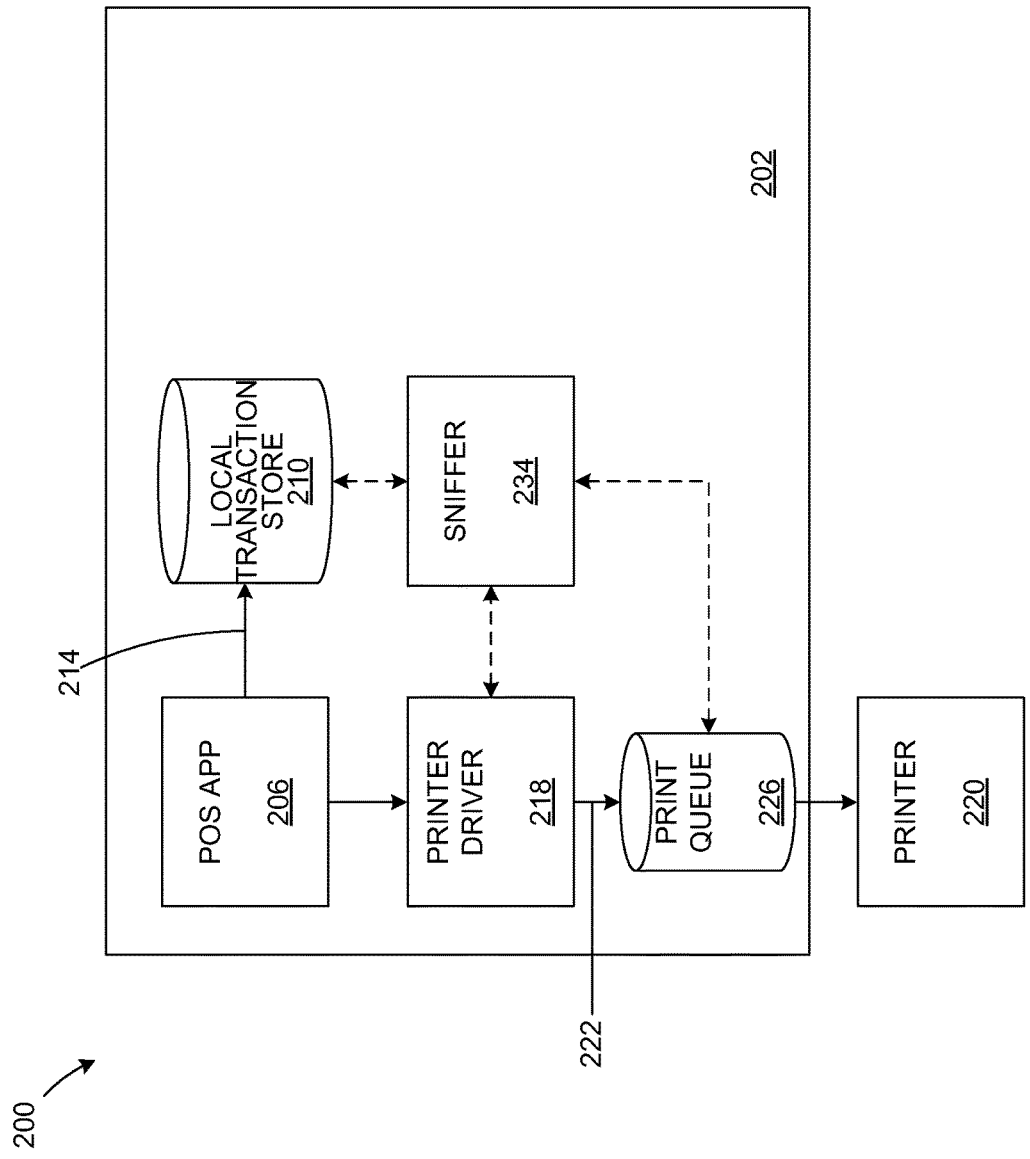
FIG. 2 is an example of a block diagram of a POS transaction collection system implemented through a POS terminal.

Referring now to FIG. 2, therein is shown an example of a block diagram of a POS transaction collection system 200 implemented through a POS terminal 202. The POS transaction collection system 200 can be, for example, the transaction collection system 100 of FIG. 1. The POS transaction collection system 200 can include the POS terminal 202, such as the POS terminal 102 of FIG. 1.

The POS transaction collection system 200 can included one or more method of collecting transaction entries from the POS terminal 202. The one or more methods can be implemented by modules or applications described below, including associated components and storages.

The modules or applications can be implemented as hardware modules, software modules, or any combination thereof. For example, the modules described can be software modules implemented as instructions on a non-transitory memory capable of being executed by a processor or a controller on a computer system described in FIG. 6.

The transaction collection system 200 can include additional, fewer, or different modules for various applications. Conventional components such as network interfaces, security functions, load balancers, failover servers, management and network operations consoles, memory stores, components, and the like are not shown so as to not obscure the details of the system.

The POS terminal 202 can include a POS application 206. The POS application 206 is for executing a sales transaction. For example, the POS application 206 can take in credit card information, verify it, and finalize the transaction by printing out a transaction receipt. The POS application 206 can contact a merchant system, such as the merchant system of FIG. 1, to deduct a quantity of an inventory item that was involved in the sales transaction. The POS application 206 can be activated by a button of the POS terminal 202 or a swipe of a credit card.

The POS terminal 202 can include a local transaction store 210. The local transaction store 210 is a non-transitory memory space for storing a database of transaction records, such as a transaction record 214. The transaction record 214 is defined as a data structure in a database table. For example, the data structure can be a row in the database table. For example, the POS application 206 can store the sales transaction in the form of the transaction record 214 on the local transaction store 210 after payment is processed, either before or after the transaction receipt is printed.

The local transaction store 210 can be periodically backed off to another database. For example, the local transaction store 210 can be backed up in batches to the backup system 128 of FIG. 1.

The POS terminal 202 can include a printer driver 218. The printer driver 218 is a piece of software store on non-transitory machine-readable storage medium for interacting with a printer hardware 220, such as the printer 122 of FIG. 1. The printer driver 218 can act as a translator between the POS application 206 and the printer hardware 220. The printer driver 218 can generate a printable page 222 from the sales transaction for printing. The printer driver 218 can spool the printable page 222 to a print queue 226 for printing. The printable page 222 is defined as a document describing an image to be printed. For example, the printable page 222 can be described in a page description language, a bitmap image, a compressed image, or any combination thereof.

The POS terminal 202 can include the print queue 226. The print queue 226 is defined as a reserved area of memory that holds output designated for the printer hardware 220 until the printer hardware 220 can receive the output. The print queue 226 can be coupled to the printer driver 218 for receiving the printable page 222.

The POS terminal 202 can include a sniffer module 234. The sniffer module 234 can execute a daemon process. The daemon process is defined as a background computer program process that is not under the direct control of an interactive user. The sniffer module 234 is for collecting transaction documents, such as the transaction document 118 of FIG. 1, the printable page 222, or the transaction record 214.

The sniffer module 234 can be optionally coupled to the printer driver 218, the print queue 226, the local transaction store 210, or any combination thereof, as illustrated with dotted lines. The sniffer module 234 can be embedded in the printer driver 218 or part of the printer driver 218. The sniffer module 234 can collect both the printable page 222 and the transaction record 214 to cross-check and verify the transaction information.

Figure 3:
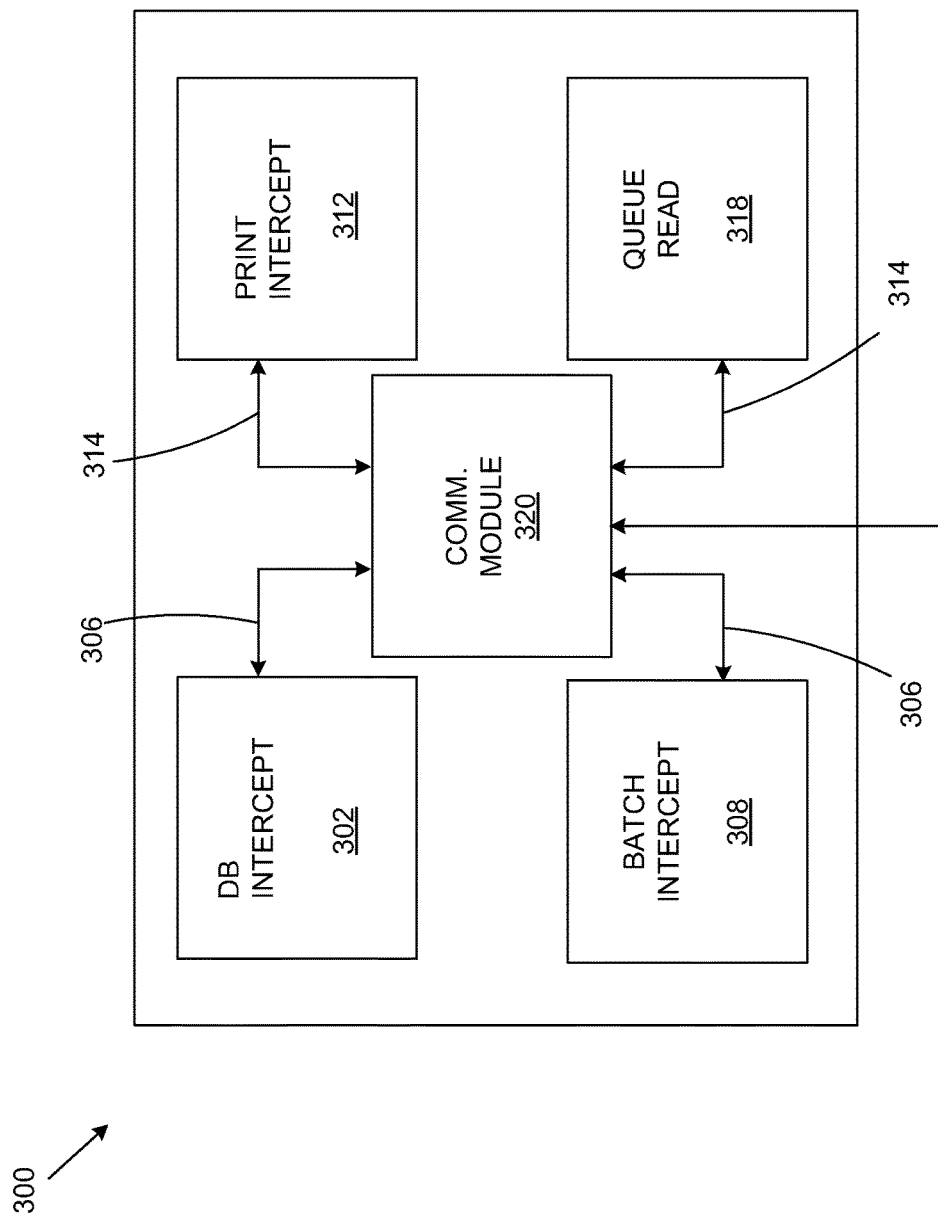
FIG. 3 is an example of a block diagram of a sniffer module.

Referring now to FIG. 3, therein is shown an example of a block diagram of a sniffer module 300. For example, the sniffer module 300 can be the sniffer module 114 of FIG. 1 or the sniffer module 234 of FIG. 2. The sniffer module 300 can sniff transaction information from a POS terminal in real-time as a sales transaction is executed by a POS application, such as the POS application 206 of FIG. 2, or in batches. The sniffer module 300 can include at least one of the following sub-modules for sniffing a transaction entry from a POS terminal, such as the POS terminal 102 of FIG. 1.

The sniffer module 300 can include a database intercept module 302. The database intercept module 302 is for accessing a transaction record 306 on a local transaction store on a POS system, such as the local transaction store 210 of FIG. 2 on the POS terminal 202 of FIG. 2. The transaction record 306 is defined as a data structure in a database table, such as the transaction record 214 of FIG. 2.

For example, an operator of the POS terminal can ring up a customer. The POS application on the POS terminal can execute a sales transaction for the customer, such as a sale of a phone. The sales transaction of selling the phone can be recorded onto the local transaction store. Here, the database intercept module 302 can intercept the record command. The database intercept module 302 can copy the transaction record 306 of selling the phone from the local transaction store and send it to an external system for interpretation, such as the collection server system 106 of FIG. 1.

The sniffer module 300 can include a batch intercept module 308. The batch intercept module 308 is for intercepting and collecting a batch backup of the transaction record 306 from the location transaction store to an external database, such as to the backup system 128 of FIG. 1.

For example, a sale of a book recorded on the local transaction store can be backed up in batches along with other item sales of the day to the backup system 128. The batch intercept module 308 can intercept and collect the batch backup including the sale of the book.

The sniffer module 300 can include a print intercept module 312. The print intercept module 312 is for collecting a printable page 314 generated by a printer driver, such as a transaction page or the printable page 222 of FIG. 2 generated by the printer driver 218 of FIG. 2. The printable page 314 is defined as a document describing an image to be printed. The print intercept module 312 can copy the printable page 314 before the printable page 314 is spooled onto a print queue.

For example, the printer driver can print a receipt for a customer who has just bought a book. The print intercept module 312 can copy the printable page 314 as it is been generated on the printer driver for printing onto a receipt. The printable page 314 can include the name of the customer on the credit card used and the item name and the item quantity. Once copied, the print intercept module 314 can send the printable page 314 to an external system, such as the collection server system 106 of FIG. 1, for interpretation.

The sniffer module 300 can include a queue reader module 318. The queue reader 318 module is for extracting the printable page 314 from a print queue, such as the printable page 222 from the print queue 226 of FIG. 2.

For example, the printer driver can print a receipt for a customer who has just bought a book by spooling a printable page of the receipt onto a print queue. The queue reader module 318 can copy the printable page 314 from the print queue. Once copied, the queue reader module 318 can send the printable page 314 to an external system, such as the collection server system 106 of FIG. 1, for interpretation.

The sniffer module 300 can include a communication module 320. The communication module 320 is for communicating with external systems via a network channel, such as the network channel 110 of FIG. 1. The database intercept module 302, the batch intercept module 308, the print intercept module 312, and the queue reader module 318 can copy the collected transaction record 306 or the printable page 314 and transmit them to the communication module 320 to transmit to an external system for recognition or interpretation, such as the collection server system 106 of FIG. 1. Prior to transmitting the collected transaction records 306, the communication module 320 can normalize the printable page 314 such that each transmitted copy is approximately the same page size or file size.

The communication module 320 can also receive feedbacks from the external system. For example, the communication module 320 can receive a message to print out a coupon in real-time in response to the printable page 314 or the transaction record 306 being sent.

Figure 4:
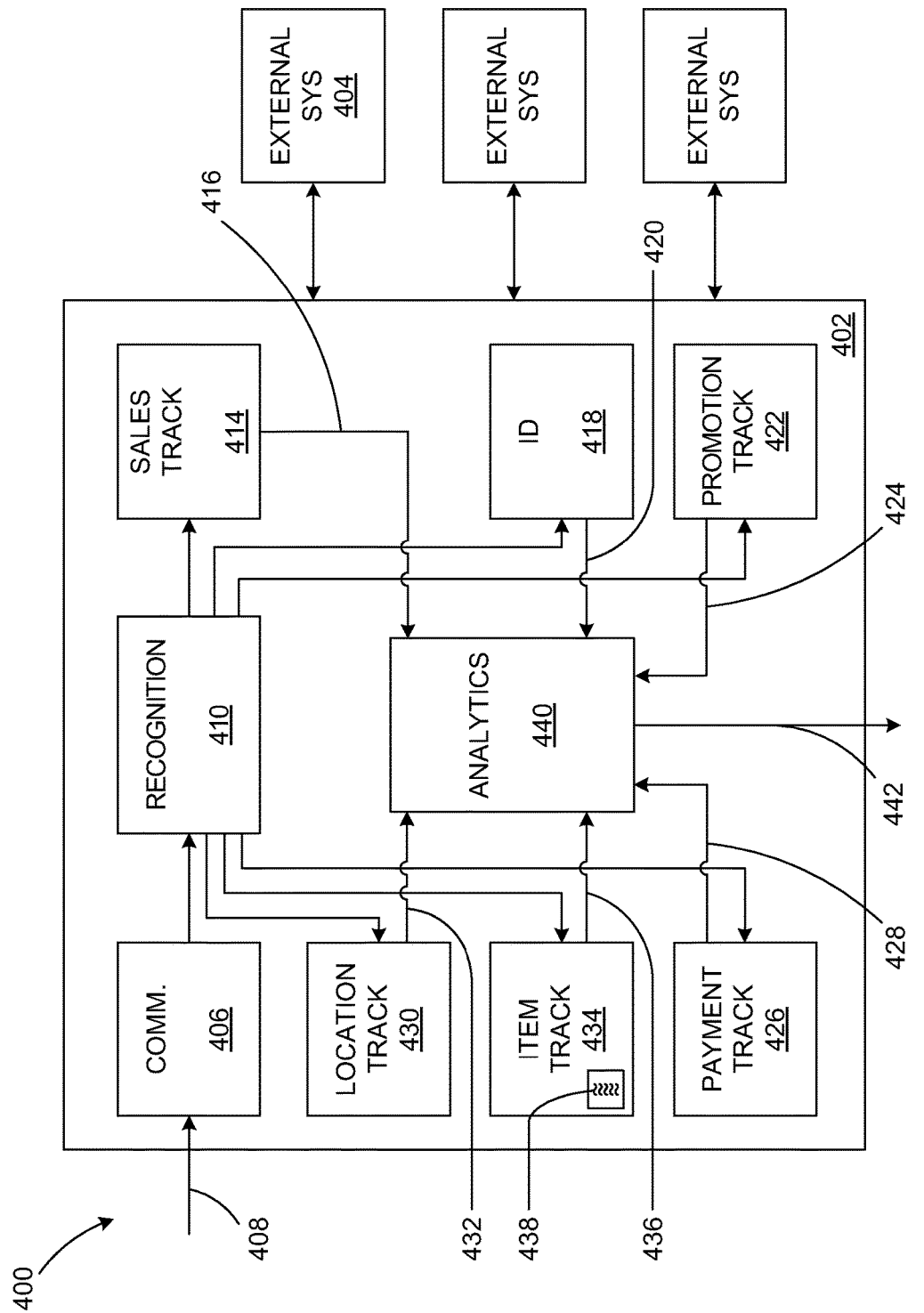
FIG. 4 is an example of a control flow of a transaction collection system in another embodiment of the present invention.

Referring now to FIG. 4, therein is shown an example of a control flow of a transaction collection system 400 in an embodiment of the present invention. The transaction collection system 400 can be the transaction collection system 100 of FIG. 1 or the POS transaction collection system 200 of FIG. 2.

The transaction collection system 400 can include a collection server system 402, such as the collection server system 106 of FIG. 1 or a web service system. The collection server system 106 can be coupled to a social network, an advertisement intelligence system, a reward system, a financial account system, or any combination thereof.

The collection server system 402 can operate as a customer relationship management (CRM) system. The CRM system is defined as a system for managing or organizing sales activities, marketing activities, customer service activities, technical support, or any combination thereof. Alternatively, the collection server system 402 can also be coupled to an external system that operates as the CRM system.

The collection server system 402 can include a communication module 406. The communication module 406 is for establishing a communication link with an external system, such as the POS terminal 202 of FIG. 2. The communication module 406 can receive a transaction document 408 from the POS terminal, such as the transaction document 118 of FIG. 1 from the POS terminal 102 of FIG. 1.

The collection server system 402 can include a recognition module 410. The recognition module 410 is for converting the transaction document 408 to a transaction entry. The recognition module 410 can be coupled to the communication module 406 for receiving the transaction document 408. The recognition module 410 can perform an optical character recognition (OCR) on the transaction document 408, such as the printable page 222 of FIG. 2. For example, the transaction document 408 can be the printable page 222 of FIG. 2 or the transaction record 214 of FIG. 2. The recognition module 410 can also run software to parse the transaction document 408, such as the transaction record 214 of FIG. 2. The recognition module 410 can output a transaction entry via the methods described above, the transaction entry including at least one of data regarding transaction date, payer name, item description, item quantity, payment method, payment amount, location, vendor name, store name, store identification, discount usage, or any combination thereof.

The collection server system 402 can include a sales track module 414. The sales track module 414 can be coupled to the recognition module 410 for receiving the transaction entry. The sales track module 414 is for tracking a sales entry 416, such as information related to a sale, including location of a sale, date of the sale, store of the sale, sales person, service personnel, whether it is a purchase or a refund, or a combination. The sales entry 416 can be sent to a merchant system, such as the merchant system 126 of FIG. 1 or the CRM system for managing sales activities.

The collection server system 402 can include an identification module 418. The identification module 418 can be coupled to the recognition module 410 for receiving the transaction entry. The identification module 418 is for tracking an online presence account 420 associated with the transaction entry. The online presence account 420 is defined as a virtual representation of a customer having a profile stored on a non-transitory memory accessible over a network, such as the network channel 110 of FIG. 1.

The identification module 418 can be coupled to at least one external system, such as a social network system or a credit card network system, to match fields of the transaction entry to the external system for identifying the online presence account 420. For example, the identification module 418 can match the credit card number from the transaction entry to a credit card number of the online presence account 420. When a match is found, the online presence account 420 is marked to be associated with the transaction entry. Other information of the online presence account 420 can be used for identifying the consumer associated with the transaction entry, such as information that can be obtained from cookies on a web browser or an online shopping account profile.

The online presence account 420 associated with the transaction document 408 can be sent to the reward system, the CRM system, or a recommendation system. The reward system can reward or credit the online presence account 420 for the sales transaction made. The CRM system can keep track of orders of the online presence account 420. The recommendation system can create a profile of purchase preferences for the online presence account 420.

The collection server system 402 can included a promotion track module 422. The promotion track module 422 can be coupled to the recognition module 410 for receiving the transaction entry. The promotion track module 422 is for tracking a promotion entry 424, such as information related to a promotion. The promotion can include an advertisement, a marketing campaign, a buyer rewards program, a rebate program, a royalty program, a discount program, a coupon program, or any combination thereof. For example, the promotion track module 422 can be coupled to the reward system or the advertisement intelligence system to track the progress of the promotion in these external systems through the sales transaction.

The promotion entry 424 is a data entry associated with a promotion that applies to the sales transaction in the transaction document 408. The promotion track module 422 can match a targeted promotion with the transaction document 408 based on the recognized sold item. The promotion track module 422 can generate a conversion rate as the promotion entry 424. The conversion rate is defined as the percentage of people exposed to the promotion that ends up executing a sales transaction for a targeted item.

The collection server system 402 can include a payment track module 426. The payment track module 426 can be coupled to the recognition module 410 for receiving the transaction entry. The payment track module 426 is for tracking a payment entry 428, such as information related to payment in the sales transaction. For example, from the transaction entry the payment track module 426 can determine the payment entry 428, including a payment type, a credit card brand, a payment amount, or any combination thereof. The payment track module 426 can be coupled to an external system, such as the credit card network system or a prepaid card debit account system, to verify information about the payment made in the transaction entry.

The payment entry 428 can be sent to a merchant system, such as the merchant system 126 of FIG. 1, or a POS terminal, such as the POS terminal 102 of FIG. 1. The payment entry 428 can be sent to verify payment made.

The collection server system 402 can include a location track module 430. The location track module 430 can be coupled to the recognition module 410 for receiving the transaction entry. The location track module 430 is for tracking location entry 432, such as information related to location-based information about the transaction entry. The location track module 430 can determine the location entry 432 of where the sales transaction occurred. For example, the location track module 430 can determine the location entry 432 from the store name or the zip code of the store. The location track module 430 can be coupled to an external system, such as the social network system or a location-based web application server, for uploading the location entry 432 to the external system.

The collection server system 402 can include an item track module 434. The item track module 434 can be coupled to the recognition module 410 for receiving the transaction entry. The item track module 434 is for tracking an item entry 436, such item type, item quantity, or other information related to an item in the sales transaction. The item track module 434 can be coupled to an external system, such as an inventory tracking system, the merchant system of FIG. 1, or the vendor system of FIG. 1.

The item entry 436 including information about the item in the sales can be uploaded to the external system for inventory tracking, sales management, delivery tracking, accounting, promotion tracking, or any combination thereof. For example, the item track module 434 can include an item list 438. The item track module 434 can receive the item list 438 from the merchant system 126 of FIG. 1, the vendor system 132 of FIG. 1, or the customer device 136 of FIG. 1. The item track module 434 can match the item entry 436 identifying a recognized sold item from within the item list 438. The item track module 434 can then mark the item entry 436 in the item list 438 as having been sold. The specifics of the sales transaction for the item entry 436, such as price, sales location, store, sales date, or any combination thereof, can also be recorded on the collection server system 402.

The collection server system 402 can include an analytics module 440. The analytics module 440 can be coupled to all of the tracking modules as a source of data to provide statistics for displaying on a device. The statistic can be based on the sales entry 416, the online presence account 420, the promotion entry 424, the payment entry 428, the location entry 432, the item entry 436, or any combination thereof. For example, the device can be the POS terminal 102 of FIG. 1, the vendor system 132 of FIG. 1, the merchant system 126 of FIG. 1, the customer device 136 of FIG. 1, or any combination thereof. The statistic can be for a brand, a store, a buyer account, a promotion program, a product or service, or any combination thereof.

The analytics module 440 can be coupled to the communication module 406 (not shown) to send out a message 442 to an external system, based on the statistics, the sales entry 416, the online presence account 420, the promotion entry 424, the payment entry 428, the location entry 432, the item entry 436, or any combination thereof.

For example, the message 442 can be a payment message or a credit message to the external system based on an identity entry, such as the online presence account 420. The message 442 can be used to make payments to the merchant system 126 of FIG. 1 or the POS terminal 102 of FIG. 1. The credit message can also be for giving an incentive reward to a financial account of the online presence account 420.

For another example, the analytics module 440 can receive a payment message for the item entry 436 from a user device, such as the customer device 136 of FIG. 1. The payment message indicates that a payment has been made for the item entry 436. In response to receiving the payment message and the item entry 436, the analytics module 440 can send the message 442 as a credit message to the POS terminal, such as the POS terminal 102 of FIG. 1, indicating that the transaction has been paid for.

For yet another example, the message 442 can include a real-time price average message for an advertisement system. The analytics module 440 can determine the real-time price message based on the payment entry 428 or the sales entry 416. For example, by storing sales entries such as the sales entry 416 of an item or the item entry 436, the analytics module 440 can determine an average price for the item to send as the message 442 to the advertisement system. The advertisement system can then display the real-time average price on a display to potential customers.

For yet another example, the message 442 can include a recommendation message. The analytics module 440 can store a profile of purchasing pattern based on the transaction entries. The analytics module 440 can also be coupled to an external system, such as the social network system, for determining related item recommendations. The analytics module can then determine a recommended product based on the purchasing pattern or the related item recommendations. The message 442 can include the recommended product to be sent over to the POS terminal or the merchant system.

For yet another example, the message 442 can include an inventory update message. The inventory update can be based on the item entry 436. The quantity of the item entry 436 can be used in the inventory update message to update an inventory list of the CRM system, the merchant system, or the vendor system.

For yet another example, the message 442 can be an instant reward message. The instant reward message can include a message to the POS terminal to print out a coupon immediately. The instant reward message can include a message to an external system to place a rebate, an incentive, a discount, or a credit in a customer's online presence account, such as the online presence account 420, where the customer is identified in the transaction entry by the recognition module 410.

Figure 5:
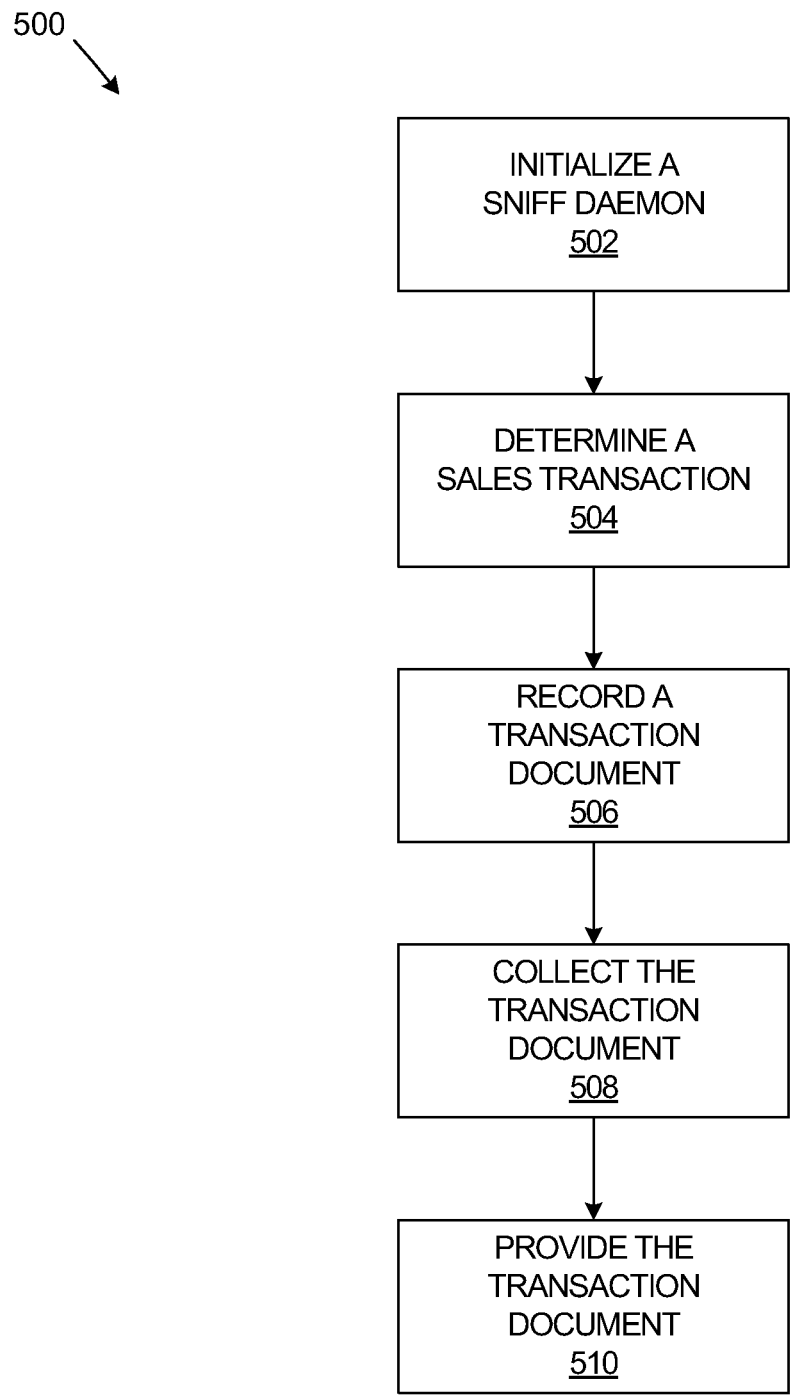
FIG. 5 is a flow chart of a method of operation of the transaction collection system in a further embodiment of the present invention.

Referring now to FIG. 5, therein is shown a flow chart of a method 500 of operation of the transaction collection system 100 of FIG. 1 in a further embodiment of the present invention. The method 500 includes: initializing a sniff daemon on the POS terminal in a block 502; determining a sales transaction on the POS terminal in a block 504; recording a transaction document of the sales transaction on a memory of the POS terminal in a block 506; collecting the transaction document from the memory with the sniff daemon in a block 508; and providing the transaction document for interpretation on an external system in a block 510.

Here, the transaction document can be, for example, the printable page of FIG. 2 or the transaction record of FIG. 2. The memory can be, example, the print queue of FIG. 2 or the local transaction store of FIG. 2.

Figure 6:
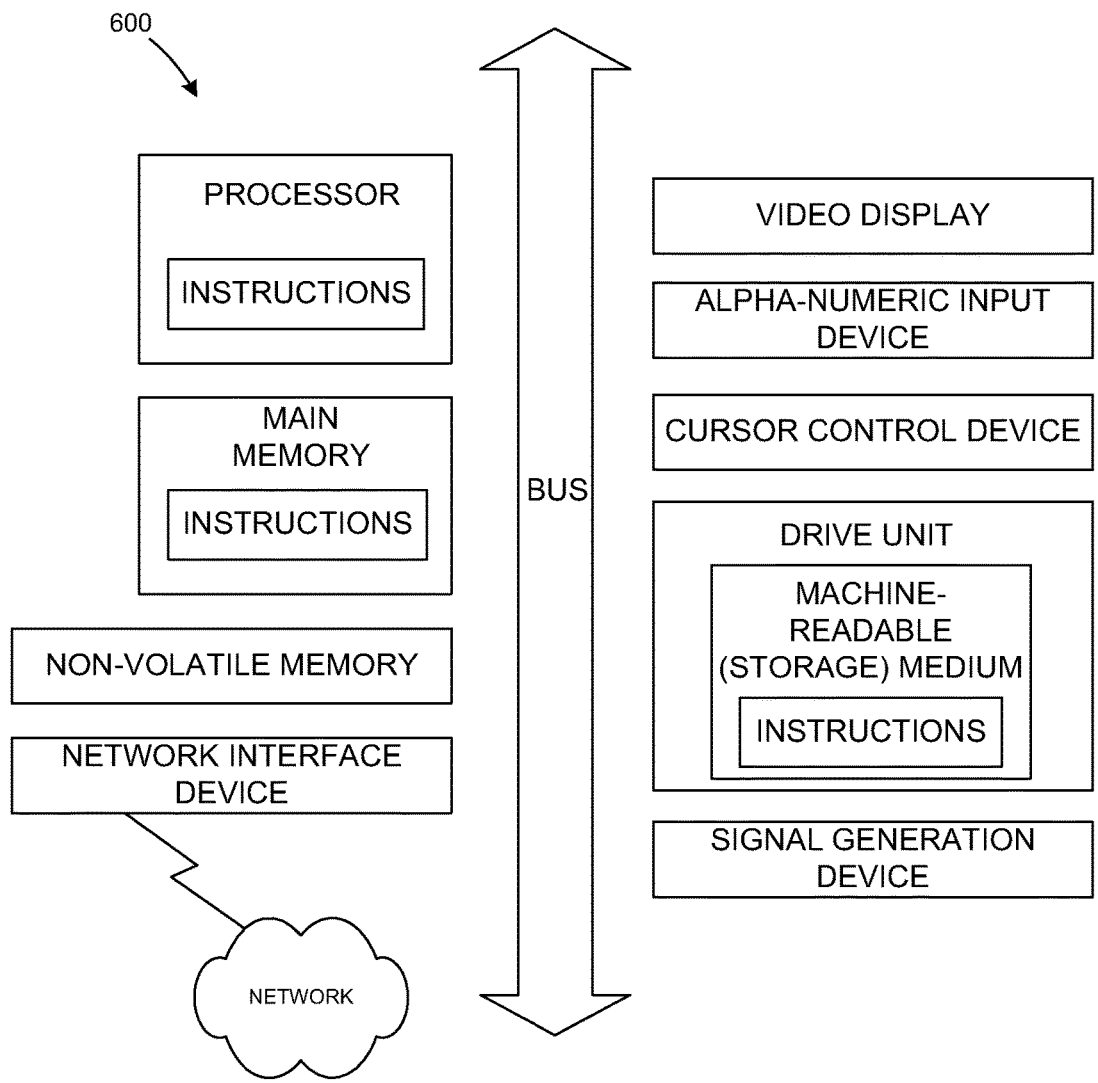
FIG. 6 is a diagrammatic representation of a machine in the example form of a computer system within which a set of instructions, for causing the machine to perform any one or more of the methodologies or modules discussed herein, may be executed.

Referring now to FIG. 6, therein is shown a diagrammatic representation of a machine in the example form of a computer system 600 within which a set of instructions, for causing the machine to perform any one or more of the methodologies or modules discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the example of FIGS. 1-4 (and any other components described in this specification) can be implemented. The computer system 600 can be of any applicable known or convenient type. The components of the computer system 600 can be coupled together via a bus or through some other known or convenient device.

This disclosure contemplates the computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   initializing, by a processor of a point-of-sale (POS) terminal, a sniff daemon as a background process executing at the POS terminal;
   detecting, by the processor configured by the sniff daemon, presence of a transaction document in a print queue memory of the POS terminal, wherein a POS application also executing at the POS terminal generates, upon verification of a payment made for a sales transaction via the POS application, the transaction document and spools the transaction document to the print queue memory as part of a receipt printing process, wherein the print queue memory is a portion of a memory of the POS terminal; and
   transmitting, by the processor configured by the sniff daemon without interaction with the POS application and before the transaction document is sent to a printer, the transaction document from the print queue memory to a collection server external to the POS terminal.

2. The method of claim 1, further comprising normalizing the transaction document prior to the transmitting.

3. The method of claim 1, further comprising interpreting the transaction document to identify an item entry.

4. A method comprising:
   initializing, by a processor of a point-of-sale (POS) terminal, a sniff daemon as a background process executing on the POS terminal, the background process being a separate process from a POS application also executing on the POS terminal;

detecting, by the processor configured by the sniff daemon, presence of a transaction document in a memory of the POS terminal, wherein the POS application generates, upon verification of a payment made for a sales transaction via the POS application, a transaction document and stores the transaction document to a memory of the POS terminal;

collecting, via the sniff daemon without interaction with the POS application and before the transaction document is sent to a printer, the transaction document from the memory;

interpreting the transaction document to determine a field entry; and sending a message to a collection server external to the POS terminal based on the field entry.

5. The method of claim 4, wherein interpreting the transaction document includes optically recognizing the transaction document.

6. The method of claim 4,
wherein interpreting the transaction document includes interpreting the transaction document to determine an identity entry; and
wherein sending the message includes sending a credit message to the external system based on the identity entry.

7. The method of claim 4,
wherein interpreting the transaction document includes interpreting the transaction document to determine an item entry; and
wherein sending the message includes sending a payment message to the external system based on the item entry.

8. A method comprising:
receiving, at a collection server system, a transaction document from a point-of-sale (POS) terminal external to the collection server system;
optically recognizing, at the collection server system, the transaction document to determine a sold item associated with the transaction document;
matching, at the collection server system, the sold item to be within an item list; and
recording, at the collection server system, the sold item on a web service system.

9. The method of claim 8, further comprising:
receiving a payment message for the sold item from a user device;
sending a credit message based on the matched sold item and the payment message.

10. The method of claim 8, further comprising:
matching a targeted promotion with the transaction document based on the matched sold item; and
tracking a conversion rate of the targeted promotion for displaying on a device.

11. The method of claim 8, further comprising rewarding an account with an incentive based on the matched sold item.

12. A system comprising:
a printer;
a point-of-sale (POS) terminal configured to execute a run-time sniffer daemon and separately a POS application, wherein the POS application is configured to:
verify a sales transaction,
generate a transaction document based at least partly on the sales transaction to print the transaction document to the printer,
wherein the run-time sniff daemon is configured to detect the transaction document in a print queue memory and to transmit the transaction document to a collection server system external to the POS terminal for interpretation; and
the collection server system configured to:
receive the transaction document from the POS terminal,
optically recognize a sold item entry from the transaction document,
match the sold item entry to be within an item list, and
record the sold item entry on the collection server system.

13. The system of claim 12, wherein the collection server system is configured to send the sold item entry to a customer relationship management system.

14. The system of claim 12, wherein the collection server system is configured to operate as a customer relationship management system for organizing sales activities.

15. A point-of-sale (POS) terminal comprising:
a processor;
a non-transitory memory storing executable modules operable when executed by the processor, the executable modules including:
a POS application configured to execute a sales transaction by generating a transaction page based at least partly on the sales transaction and by spooling, to print at a printer, the transaction page to a printer queue portion of the non-transitory memory; and
a sniffer module configured to detect presence of the transaction page in the print queue portion and transmit the transaction page to an external system for interpretation.

16. The system of claim 15, wherein the sniffer module is configured to copy the transaction page before the transaction page is spooled onto the non-transitory memory.

17. The system of claim 15, wherein the sniffer module is configured to copy the transaction page from the non-transitory memory.

18. The method of claim 1, further comprising:
in response to transmitting the transaction document, receiving, at the POS terminal, a real-time feedback from the collection server to reward a customer involved in the sales transaction reflected in the transaction document.

19. The method of claim 1, further comprising:
prior to transmitting the transaction document, normalizing the transaction document such that transaction documents transmitted from the POS terminal to the collection server share a document property that is substantially similar.

20. The POS terminal of claim 15, wherein the POS application further configures the processor to provide an encrypted channel for internal communication by the POS application within the POS terminal.

21. The POS terminal of claim 15, wherein the POS application further configures the processor to provide a proprietary interface that prevents extraction or collection of transaction data associated with the sales transaction.

* * * * *